United States Patent [19]

Kolpek

[11] 3,797,037

[45] Mar. 12, 1974

[54] SENTENCE ORIENTED DICTATION SYSTEM FEATURING RANDOM ACCESSING OF INFORMATION IN A PREFERRED SEQUENCE UNDER CONTROL OF STORED CODES

[75] Inventor: Robert A. Kolpek, Lexington, Ky.

[73] Assignee: International Business Machines Corporation, Armonk, N.Y.

[22] Filed: June 6, 1972

[21] Appl. No.: 260,343

Related U.S. Application Data

[63] Continuation of Ser. No. 50,683, June 29, 1970, abandoned.

[52] U.S. Cl. .............................. 360/72, 360/13

[51] Int. Cl. .............................. G11b 5/00

[58] Field of Search .......... 179/100.2 MD, 100.2 S, 179/100.2 Z, 1 SA, 100.1 DR; 340/172.5, 174.1 C, 162

[56] References Cited

UNITED STATES PATENTS

| | | | |
|---|---|---|---|
| 2,932,696 | 4/1960 | Shipman, Jr. | 179/100.2 MD X |
| 3,109,898 | 11/1963 | Gray | 179/100.2 MD |
| 3,222,460 | 12/1965 | Albanes et al. | 179/100.1 DR |
| 3,248,705 | 4/1966 | Dammann et al. | 340/172.5 |
| 3,423,743 | 1/1969 | Silverman | 179/100.2 MD X |
| 3,474,416 | 10/1969 | Mason | 340/172.5 |
| 3,488,443 | 1/1970 | Smith | 179/100.2 MD X |
| 3,512,137 | 5/1970 | Jones et al. | 340/172.5 |
| 3,555,509 | 1/1971 | Arsem | 340/162 |
| 3,575,555 | 4/1971 | Schanne | 179/1 SA |

*Primary Examiner*—Paul J. Henon
*Assistant Examiner*—Melvin B. Chapnick
*Attorney, Agent, or Firm*—D. Kendall Cooper

[57] ABSTRACT

A system for recording audio signals on a record medium cooperating with a transducer means, with the record medium having a plurality of segment storage areas, such as individual tracks on a belt or card, or the like, and with the storage of information taking place on a sentence, paragraph, or letter (section) basis under dictator control. The system includes means mounting a record medium for transducing operations to record and reproduce signals, a microphone input means having control buttons and a separate control panel with provision for random selection of signal tracks on the media, means for storage of related digital codes indicative of a preferred sequence of accessing of the tracks on the medium and provision for rearranging the stored digital information to revise the preferred sequence of accessing. In a preferred embodiment, the system includes a magnetic belt recording-reproducing console with tracks on the belt arranged to store audio information by sentences and by paragraphs. The unit may also be used for transcription purposes with accessing of the sentences and paragraphs in the final preferred sequence being under control of the stored digital accessing information.

9 Claims, 8 Drawing Figures

INVENTOR

ROBERT A. KOLPEK

BY D. Kendall Cooper

ATTORNEY

SENTENCE ORIENTED DICTATION SYSTEM FEATURING RANDOM ACCESSING OF INFORMATION IN A PREFERRED SEQUENCE UNDER CONTROL OF STORED CODES

This is a continuation, of application Ser. No. 50,683 filed June 29, 1970 and now abandoned.

CROSS REFERENCES TO PATENTS, APPLICATIONS, AND OTHER MATERIALS

U. S. Pat. No. 3,222,460, N. J. Albanes and Matthew P. Langendorf, inventors, entitled "Multiple Station Selection System."

U. S. Pat. No. 3,297,124, D. E. Sims, inventor, entitled "Data Recording and Printing Apparatus Capable of Responding to Changed Format."

U. S. Pat. No. 3,471,654, W. L. Dollenmayer, inventor, entitled "Transducer Driving Arrangement for Recording and Reproducing Apparatus."

U. S. Pat. No. 3,512,137, John E. Jones, et al., inventors, entitled "Correlated Recording, Reproducing, Printing, and Composing Apparatus."

U. S. Pat. application Ser. No. 699,259, filed Jan. 19, 1968, now U.S. Pat. 3,623,735, with C. M. Fackler, et al., as inventors; entitled "Dictating and Transcribing Apparatus with Automatic and Semi-Automatic Operator Controlled Facilities."

Publication "Message Announcement and Recording System," R. A. Kolpek, IBM Technical Disclosure Bulletin, Aug., 1967, Vol. 10, No. 3, pages 220–222.

U. S. Pat. application Ser. No. 50,605, filed concurrently herewith, now U.S. Pat. No. 3,671,683, with Robert A. Rahenkamp and William R. Stewart, Jr., as inventors and entitled "Sentence Oriented Dictation System Featuring Random Accessing of Dictation Segments."

OTHER REFERENCES

Customer Engineering Instruction Manual, Dictation, Dictation Equipment, IBM Models 211, 212, and 213, form No. 241-5071, dated Oct. 5, 1962.

Reference Manual, Dictation Equipment, IBM Models 211, 212, 213, and 214, form No. 241-5132, dated Oct. 22, 1962.

BACKGROUND OF INVENTION AND PRIOR ART

Prior dictation-transcription systems have incorporated facilities for recording and reproducing audio signals on a suitable medium, such as magnetic belt, or the like, under control of the dictator and/or transcriber. Invariably such prior systems contemplate the recording of signals in a fairly continuous, uninterrupted, and unsegmented fashion with no provision for rapidly locating segments of information. Some provision is made for stepping a transducer relative to the medium in a search operation, but such search operation is a rough search at best and the dictator or transcriber, as the case may be, seldom knows exactly what information has been located without taking time to listen to it. Provision has also been made in prior devices for such review of previously dictated material and recording over to correct the material, if desired. Since the material has been recorded fairly continuously and in an uninterrupted fashion, such correction procedures are somewhat difficult since the newly inserted information usually is longer or shorter than the information that it replaces.

Also, with prior devices, the dictator who is not completely organized before he starts dictation may wind up with a series of sentences and/or paragraphs that are not necessarily in a desired sequence as far as final copy is concerned. In such cases, the dictator must await the typing of a rough draft of the material, must then rework the material by deletion, insertion, and interlineation upon the draft version, and then await the retyping of the material into a final version. In many instances, two, three, and more drafts are necessary to get the material into the final preferred sequence desired by the dictator.

In summary, dictation-transcription systems heretofore have not conveniently provided for line, sentence, paragraph, or letter expansion and contraction. Further, it has not been possible to conveniently locate the beginning of individual sentences, paragraphs, and the like.

SUMMARY OF THE INVENTION

In overcoming some of the disadvantages of the prior art, the present invention contemplates dictation-transcription apparatus that also records and reproduces signals from a suitable medium, such as a magnetic belt, or the like, with recording and playback under control of the dictator and transcription under control of the transcriber, as is usual. However, the present system is organized in a highly efficient and coordinated manner to enable rapid location of previously dictated material for editing, correction, etc., and further provides for the rearrangement of segments of audio information in a more final sequence than has been possible heretofore. The present system is oriented about a dictation-transcription console having a dictator hand control and a control panel as well as auxiliary transcription facilities, as required. The apparatus records and reproduces signals on a magnetic belt having substantial length, such as in the range of 48 inches, and with the audio information arranged in individual discrete tracks on the belt thereby facilitating the organization of dictated material into useful segments, such as sentences, paragraphs, and letters, as may be desired. The dictator hand control is in the form of a microphone having the customary mode control switch to establish a Record, Listen, and Review mode as may be desired and a Dictate or Talk bar that is depressed during normal dictation in one direction in order to record signals and depressed in an opposite direction to initiate the generation of end of sentence and end of paragraph codes in the respective tracks on the belt as dictation proceeds. The dictator hand control further has paragraph and sentence locating buttons operable in both a forward and reverse direction to enable the rapid accessing of individual sentences and paragraphs on the record media. Thus, the system provides direct random access to any discrete sentence and/or paragraph.

The control panel comprises a number of mode control and display facilities including a matrix of paragraph buttons enabling the selection of individual paragraphs in any desired sequence as well as an indication by means of lamps of paragraphs that have been used and the paragraph presently in use. Means is further provided to establish a Transcription mode, an Insert mode, a Delete mode, and a Move operation whereby information in a particular sentence can be shifted, insofar as accessibility is concerned, with respect to other sentences.

With the foregoing facilities, any sentence or paragraph on the magnetic belt medium may conveniently be expanded or contracted as desired by the dictator up to the limits of the individual tracks. As an example, each track may accommodate dictated material up to 18 to 24 seconds in length. The display of lamps on the console underneath the respective selecting buttons for paragraphs and sentences shows in a cumulative manner all sentences addressed, the discrete sentence presently being addressed, and the present mode whether in a Dictate or Review mode. Paragraphs, as well as sentences, can be arranged by selecting a preferred sequence.

Facilities are also provided for rapid forward stepping and reverse stepping of the transducer in the apparatus to rapidly locate any desired segment of information such as a sentence or paragraph. Means is also provided in the system for rapidly relocating the belt record medium at the beginning of sentence tracks when this is necessary as upon completion of dictation of an individual sentence and the movement to a new sentence track. The same applies to the repositioning to the first sentence of a new paragraph.

The recording of end of sentence and paragraph indications, such as tone signals in an automatic fashion upon termination of each sentence and/or paragraph, as the case may be, facilitates the relocation of the transducer with respect to the media in order to access the next sentence segment required in any preferred sequence, both during playback during the dictation operation and during the transcription operation.

In connection with the rearrangement of sentences and paragraphs, digital code signal sets are stored in a memory, each code signal set being representative of an individual sentence or paragraph. The digital code representations in the system memory are not necessarily arranged in numerical sequence but are arranged in the sequence of accessing that may be preferred by the dictator in playing back the previously dictated material. As an example, it may be desired that paragraph 2, sentences 1, 2, 4, 6, 3, and 5, followed by paragraph 1, sentences 2, 3, 4, 1, 5, and 6 is a preferred sequence. If this is the case, then digital representations of the sentences indicated will be stored in that order in the memory and control the accessing of the paragraphs and sentences in that exact sequence.

OBJECTS

Accordingly, a primary object of the present invention is to provide a dictation-transcription system in which audio segments, such as sentences and paragraphs, are stored on an individual discrete basis enabling rapid accessing of individual segments and rearrangement if desired.

Another object of the invention is to provide a dictation-transcription system of the nature described with complete manual controls for the dictator and transcriber to facilitate the rapid location of information segments in the system and rearrangement of segments as required.

Still another object of the present invention is to provide a sentence oriented dictation system with sentences further organized in paragraphs and recording of dictated material on a magnetic medium, each sentence being allotted a particular track on the medium, and the sentences arranged in blocks to form paragraphs.

A further object of the present invention is to provide a dictation system wherein individual audio segments, such as sentences, are stored in discrete tracks on a record medium and having facilities for rearranging sentence segments in any desired order by appropriate insertion, deletion, and moving of such information.

It is also an object of the present invention to provide a system of this nature wherein digital code sets representative of the individual sentences and paragraphs recorded on the medium are stored in a memory and are rearranged as desired by the dictator to enable the accessing of the sentence and paragraph information in any desired preferred sequence.

A still further object of the present invention is to enable the efficient and convenient recording of segments of information, such as sentences and paragraphs in individual storage areas on a medium.

Still another object of the present invention is to provide a system of this nature having control adjuncts enabling efficient and convenient initiation of the required accessing, selection, and mode control functions in the system both during dictation and transcription.

The foregoing and other objects, features, and advantages of the invention will be apparent from the following more particular description of the preferred embodiment of the invention as illustrated in the accompanying drawings.

DRAWINGS

Figure 2:
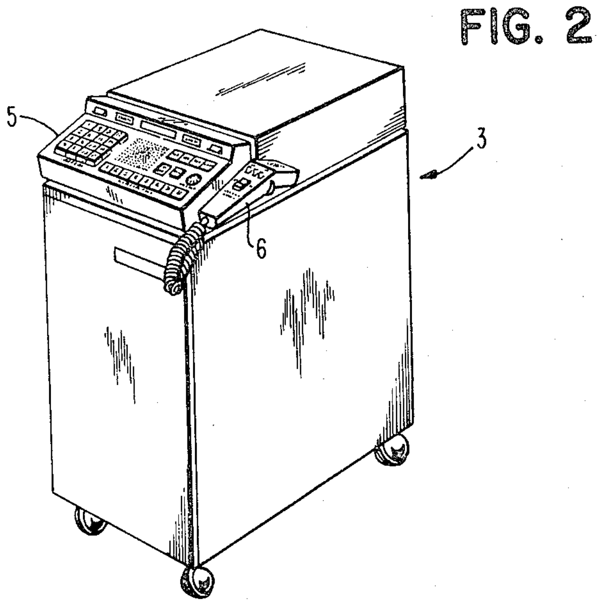
FIG. 2 is a right front perspective view of a console housing the various system components and including a hand control set and a control panel for establishment of modes and functions in the system.

FIGS. 4a, 4b, 4c, and 4d are covers-off views representing respectively a right side elevation, a left side elevation, a top elevation, and a top perspective view of the console of FIG. 2.

TERMINOLOGY AND CONTROLS

Figure 1:
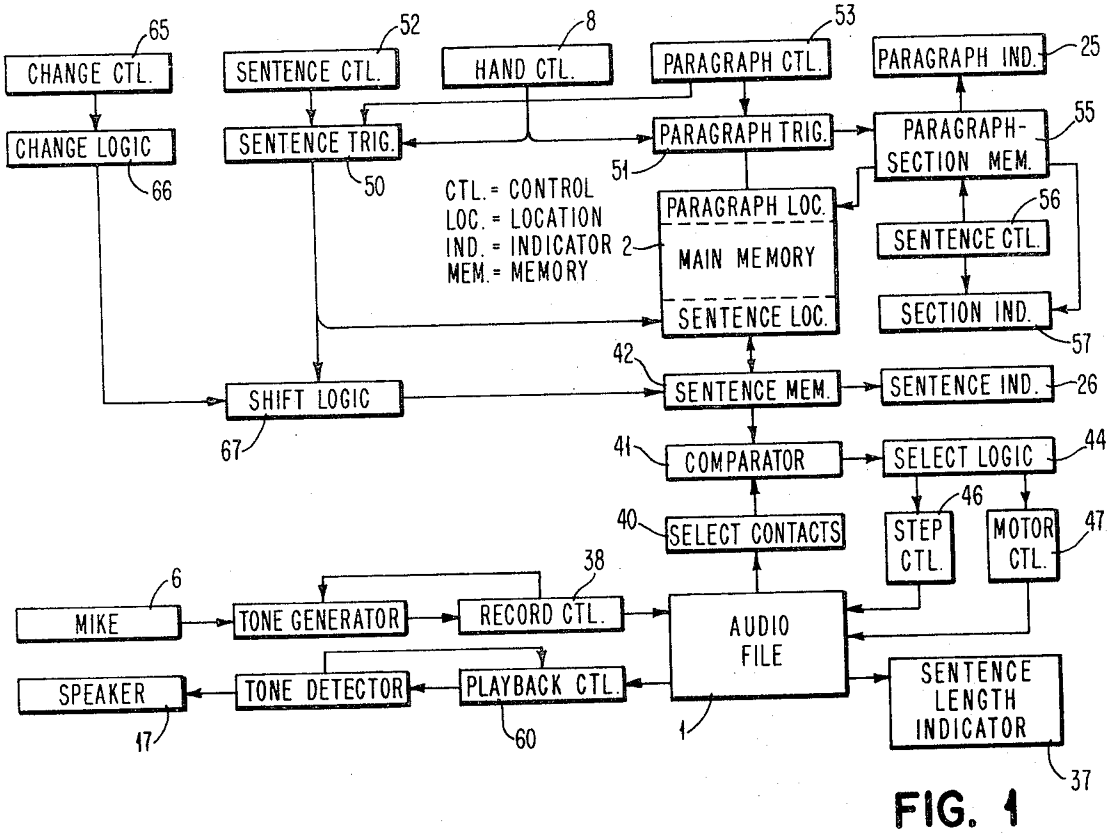
FIG. 1 is a block diagram indicating various system components and their interrelationship and including in the upper portion the automatic control and indicating facilities and in the lower portion the dictation control facilities.
Figure 3A:
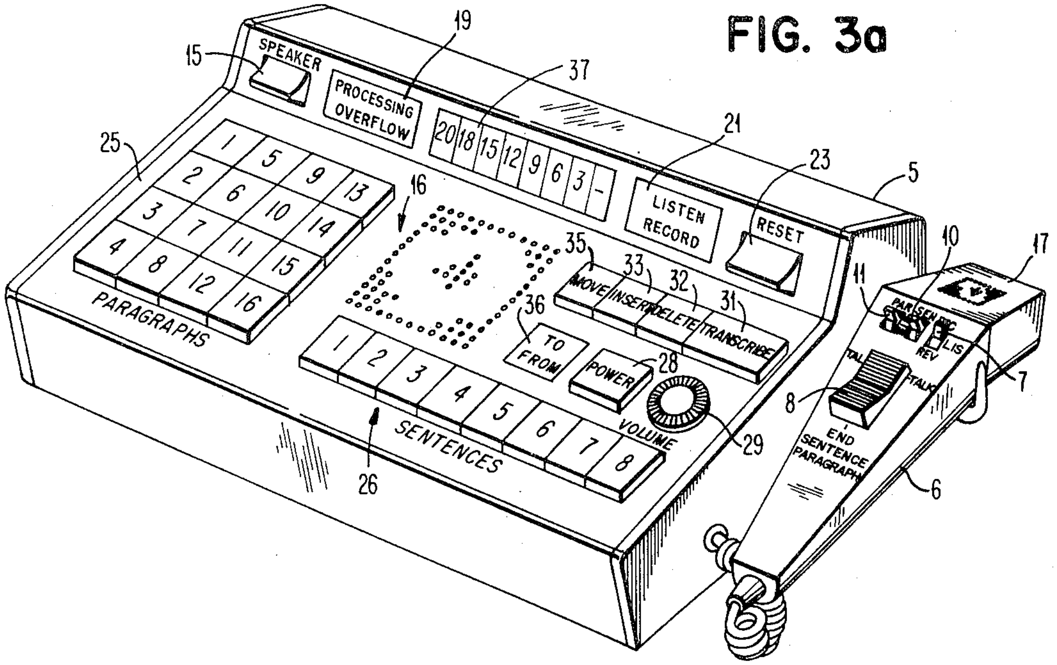
FIG. 3a is a more detailed view of the control panel and microphone hand set from the console of FIGS. 2.
Figure 3B:
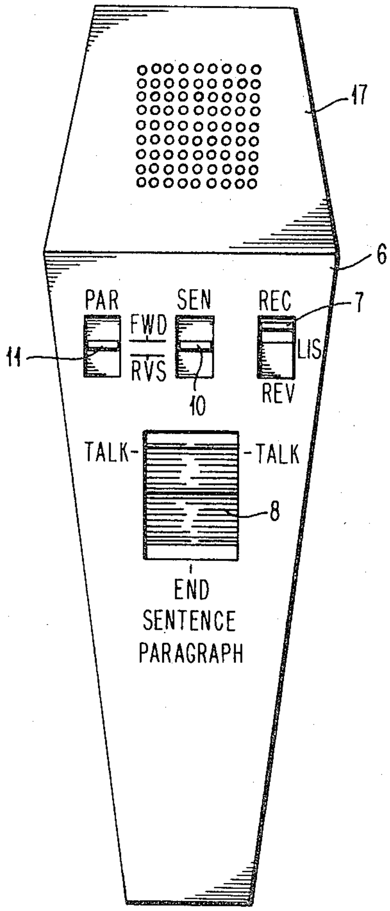
FIG. 3b is a closeup view of the microphone hand set itself.
Figures 4A, 4B:
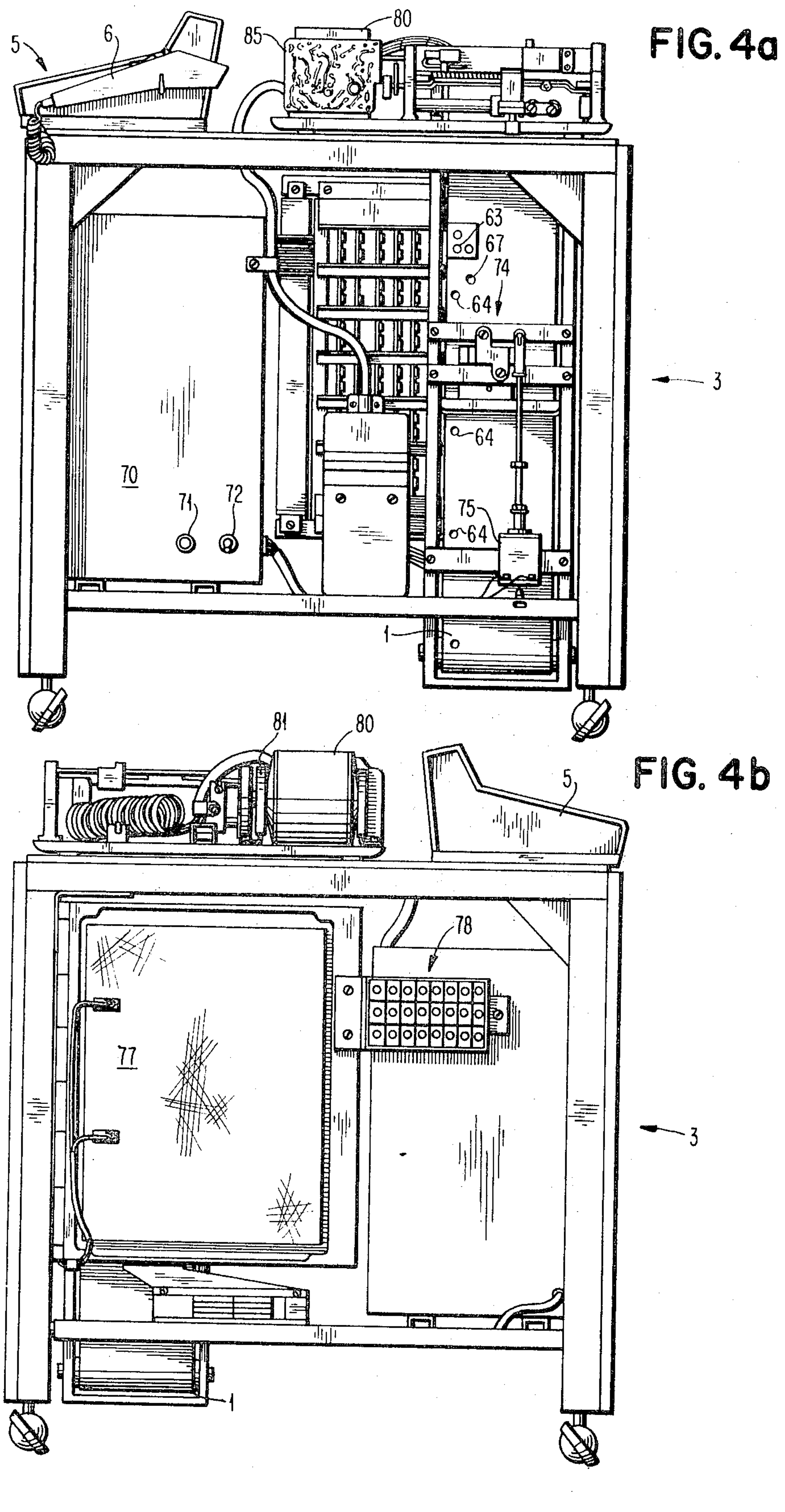
Figure 4C:
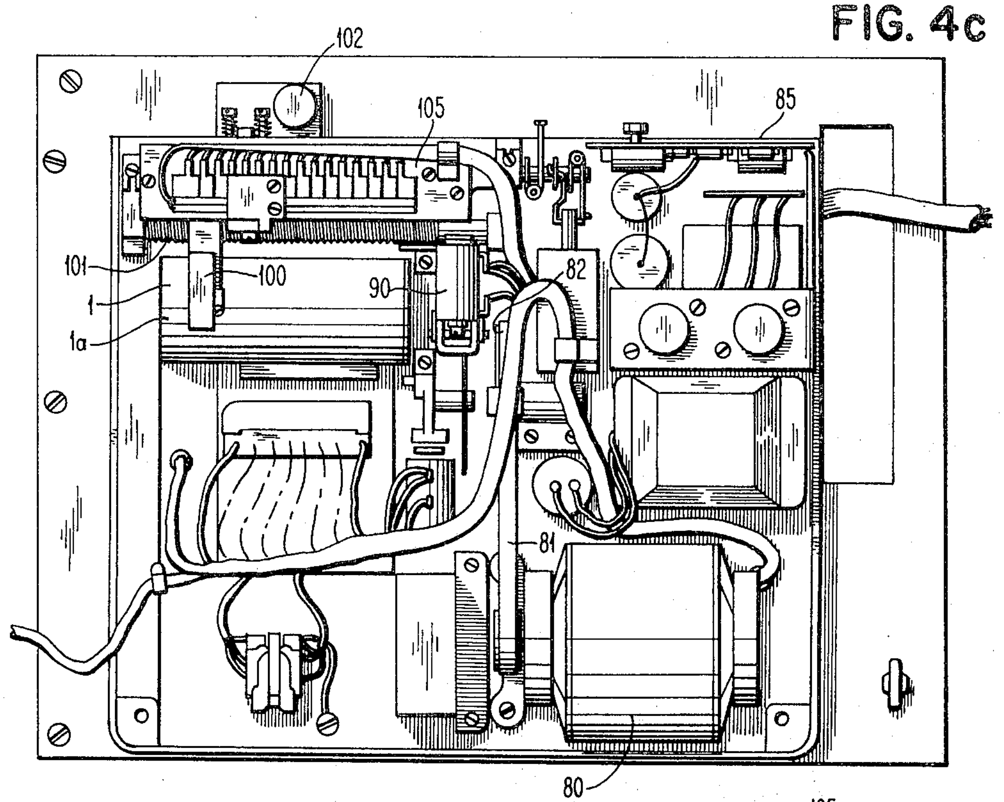
Figure 4D:
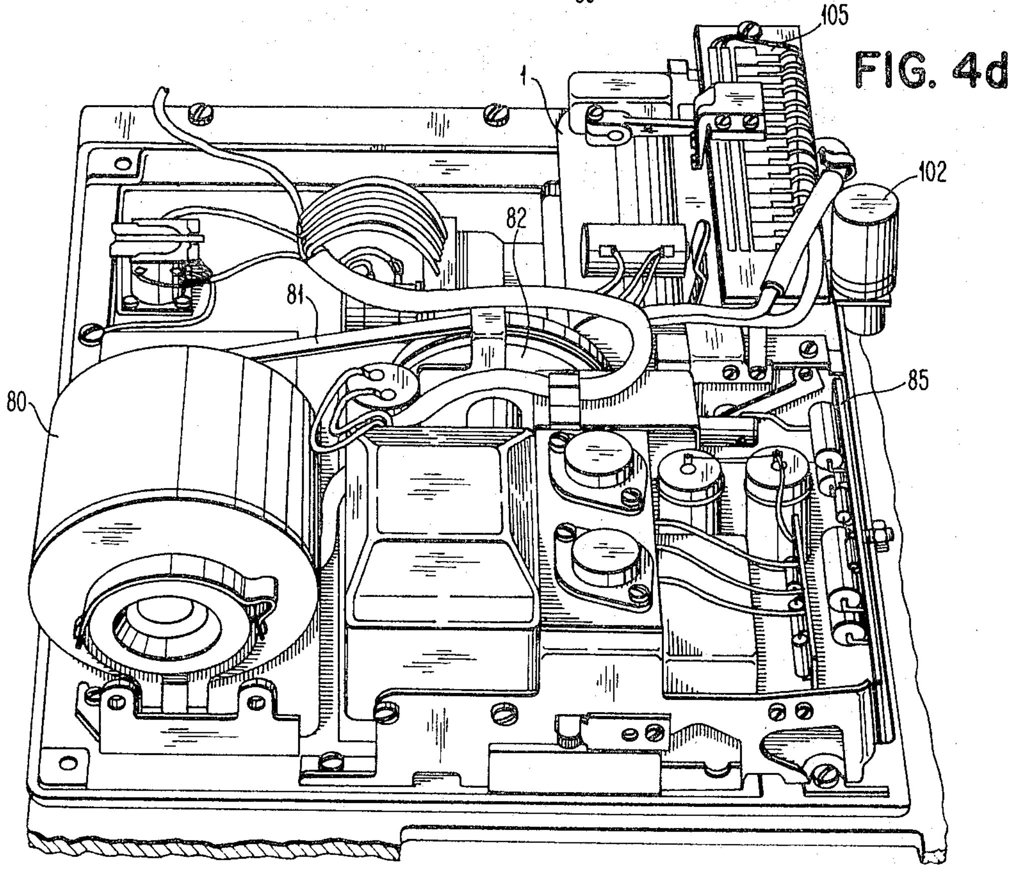

Prior to proceeding with a dicussion of the system block diagram in FIG. 1, it is believed that a consideration of various terminology and controls shown particularly in FIGS. 2, 3a, and 3b will prove useful.

Dictation-transcription unit 3, FIG. 2, contains an audio file 1 utilizing an elongated endless magnetic belt and a main memory 2 that stores sentence and paragraph locations. Positioned on the upper front portion of apparatus 3 is a control console 5 and a microphone handset 6 both shown in greater detail in FIG. 3a. The front of microphone 6 is further shown in FIG. 3b.

Some of the control facilities on control panel 5 and microphone 6 are as follows:

Record-Listen-Review Button 7. This button in the upper position establishes a Record mode, in the center position a Listen or playback mode, and in the lower position a Review mode which reverses the direction of rotation of the magnetic belt medium for a desired distance to enable the dictator to listen back to the same sentence that he is dictating.

Talk-End (Sentence or Paragraph) Bar 8. This bar has an upper portion that when depressed initiates relative movement of a transducer in relation to the magnetic belt recording medium to enable the recording of information in a selected sentence track on the medium. When the dictator has completed the dictation of the sentence, he depresses the lower portion of the talk bar once to indicate the end of the sentence. This automatically initiates recording of a tone at the end of the sentence material in that particular track and also steps the audio file 1 to the next sentence track. Upon termination of a paragraph, the dictator depresses the bar 8 downwardly twice in order to record the tone at the end of the sentence in question. This also cycles main memory 2 to replace the information in sentence memory 42 with that of the next paragraph. This also initiates stepping of the apparatus to the next paragraph section. The tone in question in the present case is an 80 cycle tone.

Sentence Button 10. This button when moved to the upper position, steps the sentence triggers 50 and sentence memory 42 forwardly sentence by sentence to access sentence locations in memory 2 in the forward direction and, when depressed downwardly, steps the sentence triggers 50 and sentence memory 42 to access sentence locations track by track in the reverse direction. The system provides for the movement to the last previously recorded sentence in the reverse direction. That is, those sentences having no recorded information in them are skipped.

Paragraph Button 11. This button when moved upwardly to the forward position steps paragraph memory 55 forwardly step by step to succeeding paragraph locations and, when moved downwardly, moves paragraph memory 55 under control of triggers 51 reversely to preceding paragraph locations in memory 2.

Considering the control console 5, this console has a number of control buttons and lamp indicators. A speaker button 15 selects speaker 16 or microphone output 17, as desired by the dictator.

Processing-Overflow Lamps 19. The processing lamp indicates the system is in use. The overflow lamp indicates that the dictator has exceeded the capacity of the sentence path presently in use.

Listen-Record-Lamp 21. This indicator comprises an upper Listen portion and a lower Record portion indicating the respective mode of the system in accordance with the status of control button 7 on microphone 6.

Reset Button 23. This button when depressed by the operator resets the memory 2, FIG. 1, to erase all previous sentence and paragraph location indications that may have been present in memory 2.

Paragraph Selection and Indicating Buttons 25. These buttons comprise a matrix of 16 paragraph selection buttons that are depressed as desired by the dictator or transcriber during operation of the system. These enable accessing of any paragraph segment directly and on a random basis by addressing the memory location. The buttons are translucent and underneath each button is a lamp that is energized at a relatively low level to indicate that the paragraph in question has been used before and that are energized at a relatively high level to indicate the current paragraph that is in use by the dictator or transcriber.

Sentence Selection and Indicating Buttons 26. These buttons, like the paragraph buttons, are translucent and comprise eight sentence selection and location buttons, each having an indicating lamp thereunder. These enable the random selection of any sentence segment within a selected paragraph. When the lamp is energized at a relatively low level, it indicates the sentence has been used, that is, has information in it, and when energized at a relatively high level, it indicates that the sentence is currently in use.

Letter (Section) Buttons. Optionally, the system may provide for arrangement of information by letters, each normally comprising a number of paragraphs as alluded to in FIG. 1. In this event, Letter select buttons (not shown) would be provided on control panel 5.

Power On-Off Button 28. Depression of this button turns power on and off to the system.

Volume Control 29. This control is adjusted to establish a desired level of sound from speaker 16.

Transcribe Control Button 31. This button establishes a Transcribe mode of the apparatus enabling recognition of the tone at the end of each sentence to step forwardly to the next sentence and when no further sentence space remains in a paragraph, the tone causes stepping to the next paragraph.

Delete Button 32. The Delete button is depressed when the dictator wishes to remove the sentence segment completely from the document. This is done by depressing the Delete button and then the number of the sentence that it is desired be deleted. The sentence location in main memory 2 is also deleted and succeeding sentences are shifted to fill up the vacancy created by deletion of the sentence in question. The deleted sentence segment assumes the identity of the last sentence in the paragraph and is marked unused.

Insert Button 33. Depression of this button results in an operation that is just the opposite of that occurring when the delete button is depressed, that is, a sentence segment is inserted in between existing sentence segments with the sentences moved or shifted as required in order to get the new sentence in position. This enables the dictator to insert a sentence anywhere that he may desire.

Move Button 35. This button is operable in conjunction with the indicator 36, that is, the "To-From" indicator to enable the shifting of sentences by positions that are greater than one track distant from their previous location. In operation, the dictator depresses the Move button, which lights the "From" portion of indicator 36, depresses the sentence "4" button, as an example, which lights the "To" portion of indicator 36 and thereafter depresses sentence "2" button. This results in the address of the fourth sentence being moved into the second location in main memory 2 with a shifting of the addresses of the other sentences as necessary which involves the shifting of the second and third sentence addresses into the third and fourth sentence locations in memory 2. Thereafter, the sentences in question will be read in the order 1, 4, 2, and 3. This will apply until the dictator rearranges the sentences in some other preferred sequence.

Lamps 37. Control panel 5 includes an indicator lamp area 37 containing, as an example, a series of eight individual lamps. These are energized under control of photosensing unit 63 and eight equally spaced timing apertures 64 on the belt (FIG. 4*a*) to indicate the extent of recording (and hence storage area left) in the sentence track presently in use.

SYSTEM DESCRIPTION

FIG. 1 is a block diagram showing the various components of the dictation-transcription system according to the present invention and as housed in the console of FIG. 2. The upper portion of FIG. 1 represents the automatic control and indicating sections of the system while the lower portion represents the dictation control functions with which the operator is most concerned.

Of primary interest in the block diagram of FIG. 1 is the audio file 1 and main memory 2. In the present system, the audio file is in the form of an endless belt medium that is 48 inches in length and that is designated by a corresponding reference numeral in FIGS. 4*a*–4*d*. The record medium in the present case can accommodate 16 paragraphs, each comprising eight sentences representing a total of 128 segments of information, or 128 individual tracks (segments) on the medium. To access the individual tracks, the system is provided with track stepping or incrementing facilities, a high speed forward clutch, belt contacts, photocells to indicate the position of the head on any track, a printed circuit board to locate the position of the head over the first track in a paragraph, and an additional forward-reverse motor working in conjunction with the printed circuit to move the head quickly between one paragraph and another paragraph. All of these elements will be described in detail subsequently. As constituted, the audio file makes use of some mechanisms that are comparable to those taught in the Albanes and the 210 series dictation manuals in the Cross-reference section but could easily make use of mechanisms taught in the Fackler, et al., patent application which also makes use of a magnetic belt record medium. Further, it is contemplated that the elongated magnetic tape shown in the Sims patent or the magnetic card medium shown in the Dollenmayer patent could be adapted for use in the present system. In the present system, the magnetic belt is approximately four times as long as the magnetic belt used in the Albanes, et al., and Fackler, et al., systems providing approximately 48 inches of recording length per track. This normally proves to be an adequate time and space to record sentences.

The main memory 2 comprises approximately 5120 locations that serve to store digital code representations of the locations of sentence segments in the audio file 1. Obviously, not all of the locations in memory will be used since all paragraphs will not have exactly eight sentences. Memory 2 has four slots allotted for recording of pertinent information with respect to each of the sentence segment locations designated A, B, C, and D. Slots A, B, and C comprise three locations that are used to indicate the sentence track number, while location D is used to indicate if the sentence segment in question has been recorded upon by the dictator. As sentences are deleted, inserted, or shifted around within a paragraph, the corresponding location numbers of the respective sentences involved are also shifted in memory 2. This provides for a proper sequence during playback of the sentences in the audio file 1 irrespective of the locations of those sentences on the magnetic belt 1.

Main memory 2 further comprises a number of locations accommodating paragraph assignment numbers up to four bits (E, F, G, H) in length for determining paragraph location in the main memory. An additional four bits (J, K, L, M) indicate to which section the paragraph has been assigned. When paragraphs are shifted, inserted, or deleted, the corresponding numbers in the paragraph portion of memory 2 are also changed accordingly so that the numbers represent the sequence that the paragraphs in the audio file 1 should be played back.

A brief description of the components in FIG. 1 will illustrate the operation of the system.

It will be recalled that depression of the Reset button 23 places the system in a condition for recording an entirely new sequence of sentences and paragraphs. Main memory 2 is loaded as if all segments are to be played out in sequence, but the segments are marked as being unused. The dictator manipulates microphone 6 (mike) to establish a Record mode by means of button 7 and record control circuit 38. This starts the relative movement of the magnetic belt medium in the audio file 1 with respect to the transducer upon depression of the Talk bar 8 by the dictator to record the material that he desires. Initially, main memory 2 stores the sentence locations of the first paragraph in sentence memory 42, sets sentence triggers 50 to 1 and paragraph triggers 51 to 1. Lamps under paragraph button 1 and sentence button 1 are illuminated on control panel 5, FIG. 3*a*. Addresses of sentences presently in use are stored in sentence memory 42. It should be pointed out that upon depression of the Reset button, the entire belt surface is erased by mechanisms to be described. During operation of the system in a Record mode, the belt drive clutch or normal clutch is activated upon depression of Talk bar 8 and the amplifier circuits are energized to amplify signals from microphone 6 for recording in the first sentence, first paragraph track, on magnetic belt 1. The marking of the sentence cell 1 in sentence memory 42 as being in use occurs upon depression of Talk bar 8.

Upon termination of the sentence segment in question, the dictator rocks the Talk bar 8 to depress the lower portion thereby recording a tone at the end of the audio information in the sentence 1 track on magnetic belt 1 and initiating the stepping of the system to the next sentence track on magnetic belt 1. This involves the select contacts 40, the comparator circuit 41, the sentence memory 42 cooperating with select logic 44 which controls the operation of a stepping control circuit 46 and a motor control circuit 47. The operation is such that the transducer is stepped or indexed to the next sentence segment track on the magnetic belt medium, the sentence memory 42 is activated to store the fact that sentence location 2 is now in use and follows sentence 1 in that sequence, and it is further operable to illuminate at a higher intensity the No. 2 sentence selection button on control panel 5. The No. 1 sentence button remains illuminated under control of the sentence memory at a relatively low level to indicate that it has information stored in it. Main memory 2 is activated when moving information in the system on a paragraph basis.

As he dictates, the dictator may reserve sentence locations by simply depressing the sentence control button 10 on microphone 6, FIG. 3*b*, in the forward direction. This automatically records a tone in each sentence track and steps the apparatus under control of stepping control circuit 46 to the next succeeding sentence track, and returns the belt to the starting position under control of photosensor 63 in conjunction with the start of sentence aperture 67 shown in FIG. 4*a*. The sentence buttons 1–8 will be appropriately illuminated at a relatively low level under such circumstances to indicate that the sentences in question are marked as being in use. However, during playback, the tone recorded at the beginning of the sentence tracks in question will upon recognition immediately initiate stepping to the succeeding sentence track until information is located for playback.

Other portions of the system involved during this operation include the hand control 8 in the upper portion of FIG. 1. Sentence, Forward, and Reverse button 10 associated with hand control circuit 8 and sentence control buttons 26 and sentence control circuit 42 function to select a sentence within a given paragraph. Paragraph Forward and Reverse button 11 and hand control circuit 8 cooperate with the sentence and paragraph triggers 50 and 51, respectively, to control the stepping of main memory 2 for storing of the locations of the sentence and paragraph segments in main memory 2. The paragraph-section memory 55 is operated by buttons 25 through paragraph control 53 to select paragraphs and controls the paragraph indicators 25 on control panel 5. Memory 55 also controls the section indicators 57 if such are provided. The status of paragraph section memory 55 is influenced by sentence control block 56 which also controls the status of the section indicators in conjunction with memory 55. The section indicators would be provided if it is desired to be able to select larger blocks of information such as letters or comparable size portions of information. Sentence memory 42 cooperates with the sentence indicators 26 on control panel 5 to appropriately illuminate these as required during operation.

Upon recording the last sentence in any paragraph, the dictator rocks the talk bar 8 twice in the lower portion which records the end-of-sentence tone. When this occurs, the sequence of organization or presentation of the sentences in the paragraph just completed as stored in the sentence memory 42 is transferred or written into main memory 2 for subsequent use in accessing this information. Concurrently, the address information of the next following paragraph as they exist in main memory is transferred to the sentence memory 42. In the assumed case, since the system has been reset, the sentences in the next paragraph will occur in the same numbered sequence, that is, 1 through 8, as indicated by the buttons 26 on control panel 5, FIG. 3*a*. The selection and indicator buttons 25 and 26 are operated in such a fashion that paragraph 2 is illuminated at a relatively high level together with sentence button 1.

Button 1 continues to be illuminated at a fairly low level to indicate that this paragraph has information stored in it. A blinking lamp indicates an unused segment.

Insofar as the magnetic belt is concerned, since each paragraph comprises eight sentences or eight tracks on the magnetic belt, the first sentence or track in paragraph 2 will be recorded on track no. 9 of the belt.

Some of the other operations of interest controlled by microphone 6 are as follows.

REVIEW

When the dictator depresses button 7 downwardly to the lowermost position, a short roll back of the magnetic belt medium occurs with respect to the transducer to enable the review of the information just dictated. Button 7 is spring loaded from the lower Review position to the center Listen position so that it will return to the Listen position and establish a Listen mode for review of the information, During such mode, playback control 60 provides signals to speaker 17 (or speaker 16) as selected by the selection button 15. Accordingly, operation of the Review button is not sentence oriented, that is, it merely involves the review of information within the same sentence that is currently in use. The dictator cannot move past the beginning of the sentence presently in use by operation of the Review button.

REVERSE BY SENTENCE AND PARAGRAPH

If sentence button 10 is operated in the reverse direction, the system relatively moves the magnetic belt medium and the transducer back to the beginning of the same sentence that is presently in use. This is referred to as a long roll back. This assumes that the button 10 is depressed downwardly only once. Further depression of button 10 downwardly results in the memory stepping back to the previously recorded sentences. Intervening unrecorded sentences are skipped. Accordingly, continued depression of the button 10 downwardly results in the stepping of the memory segment by segment at a regular cadence with appropriate movement of the illuminating lamps under the sentence buttons 26 and appropriate sound feedback. If the system is in a Record mode, the stepping discontinues when the dictator lets up on button 10 and the system indexes to the selected segment and stops. If the system is in a Playback mode, the system automatically indexes to the selected segment and starts playing back the information in the sentence reached after the dictator lets up on button 10. A comparable operation occurs upon depression of the paragraph button 11 with movement paragraph by paragraph across the magnetic belt medium to the extent of the paragraphs provided, which in this case is 16 when the operator lets up on button 11.

SENTENCE FORWARD AND PARAGRAPH FORWARD

Movement of the appropriate sentence button 10 and paragraph button 11 to the upper position results in stepping of the sentence memory or paragraph memory, respectively, in a forward direction sentence by sentence or paragraph by paragraph, as the case may be, to access the segments of information to the extent desired by the dictator.

RANDOM SELECTION OF SENTENCES AND PARAGRAPHS

It is possible for the dictator, while he is using the equipment, to forego the stepping controls 10 and 11 which move the transducer on an incremental basis track by track across the medium to go directly to a desired sentence and paragraph location by appropriate depression of the paragraph and/or sentence button that he may desire. Thus, the system provides for a completely random key selection of sentences and paragraphs. As such random selection occurs, the sequential digital accessing information in main memory 2 is moved out into the sentence memory 42 as each paragraph is encountered.

DELETE

As previously indicated in an earlier section, depression of the Delete button 32 on control panel 5 followed by depression of a particular sentence button 26 results in manipulation of the address locations in memory in such a fashion that the address location of the particular sentence in question is removed from the sentence addresses, and all succeeding addresses are shifted by one in an upward direction in order to fill the vacancy. The deleted address is relocated in the first vacant sentence location for possible reuse but is marked as unrecorded.

INSERT

Also as previously indicated, depression of the Insert button 33 on control panel 5 by the dictator followed by depression of a particular sentence button results in the insertion of any designated sentence in a desired location. When the Insert button is depressed followed by a particular sentence location, that sentence location and all succeeding locations are moved downwardly by one to create a vacancy or unrecorded sentence segment prior to the sentence number that is indicated.

MOVE

The various controls just described including the Delete button 32, the Insert button 33, and the Move button 35, to be described, are incorporated generally in the "change" control circuit 65, FIG. 1, and are effective to operate the change logic 66 and shift logic 67 to accomplish the desired purposes. Depression of Move button 35 results in lighting of the indicator 36 with a "From" indication. The dictator thereupon selects a sentence that he wishes to relocate in the memory, such as sentence 4, which is followed by illumination of the "To" portion of indicator 36. The dictator then depresses the location to which he wishes to move the selected sentence, such as location 2, and the memory 2 is operated automatically to shift the sentence 4 address up to the second address position and shift addresses of the second and third sentences into the third and fourth address positions, respectively. As previously described, the accessing sequence as preferred by the dictator will then be 1, 4, 2, and 3, in that order. It is entirely possible to operate the controls in such a fashion that a sentence may be moved from one paragraph to another. In such case, a combination of the Delete button 32 and Move button 35 is required. The operation of the buttons is the same as for a Move operation with the exception that prior to pushing a new sentence location button, the operator pushes the button of the new paragraph. This results in deleting the sentence in the old paragraph and moving the sentence to the new paragraph. This is effectively done by simply relocating the addresses involved.

It is thus seen that the various controls and components of the system establish considerable flexibility in the processing of audio information particularly with respect to the arrangement and rearrangement of such information in segments, such as sentences and paragraphs.

ELECTRONIC AND MECHANICAL COMPONENTS

FIGS. *4a*, *4b*, *4c*, and *4d* are covers-off views of apparatus 3 shown in FIG. 2 illustrating various components that are provided in the system. The console 5 is shown in FIGS. *4a* and *4b*, while microphone 6 appears in FIG. *4a*. The system includes the 48 inch magnetic belt 1 serving as the audio file and arranged to hang downwardly within the main frame of the console 3.

The apparatus includes a power supply 70 with control buttons 71 and 72. Positioned adjacent the magnetic belt 1 in FIG. *4a* is an erase magnet structure 74 that is operated under control of a solenoid 75 upon depression of the Reset control button 23, FIG. *3a*, in order to erase the magnetic belt 1 in its entirety in preparation for the recording of a new series of sentences in paragraphs.

In FIG. *4b* is shown an electronic logic module 77 and a servicing panel 78 having a number of lamps that serve to show by their coded configuration what is stored in memory 2.

Other items of interest appear in FIGS. *4c* and *4d* as well as in some cases in FIGS. *4a* and *4b*. As shown in these views, the driving system comprises a motor 80 arranged for driving interconnection through a pulley 81 with various mechanisms in the apparatus in order to relatively move the belt medium and the transducer with respect to one another. A circuit board 85 incorporates some of the components necessary for operation of the system. While not shown in every detail, the drive from pulley 81 is coupled through pulley 82 to drive the magnetic belt medium 1 in a forward direction at a fairly normal speed for use during recording and playback of signals. The clutching arrangements are comparable to those shown in connection with the 210 equipment set forth in some of the manuals cross referenced as well as in the Albanes et al patent. Fast forward involves the operation of a fast forward magnet 90 and appropriate insertion of an extra feed roll in a manner comparable to the roll-back mechanism in the 210 series. A review operation is controlled logically by driving magnetic belt medium 1 in a forward direction for 42 inches of its length each time a review operation is required; and since the belt is 48 inches long, this results in a net movement of the transducer in the reverse direction a total of 6 inches of track length. As viewed in FIG. *4c* incidentally, sentence location 1 is at edge *1a* of magnetic belt 1. A detent control magnetic is provided to disengage the transducer 100 from lead screw 101 for high speed movement of the transducer relative to belt 1. Indexing by paragraphs on belt 1 is accomplished by a drive motor moving transducer 100 after it is disengaged from lead screw 101.

Indexing of transducer 100 with respect to belt 1 by sentences is under control of the index motor 102 as well as the reverse mechanisms controlled by the logic in the machine. Indexing or stepping from track to track occurs at the rate of 10 per second, and the operation is comparable to a clock escapement. A printed circuit board 105 is incorporated in the logic and made use of in order to determine the relative location of transducer 100 with respect to belt 1 and to move it from the current track location to a desired track location. Such stepping control including the printed circuit could take the form of that shown in the Kolpek publication of Aug., 1967.

TRANSCRIPTION

The system is placed in a Transcribe mode by depression of button 31 and during such mode, sentences and paragraphs on the magnetic belt medium 1 are played back to the transcriber under control of the addresses stored in main memory 2. An auxiliary control, not shown, may be provided for connection into the console 3 to enable foot control operation of the system by the transcriber. It is entirely feasible to provide an additional control adjunct which upon depression rapidly re-records the information on magnetic belt medium 1 onto a second permanent medium for subsequent transcription. It is also possible to provide logic whereby the sentences and paragraphs on magnetic belt 1 are rearranged automatically during such re-recording process so that they will appear on the second medium in the preferred sequence for use by the transcriber. A single audible tone is recorded following each sentence while two tones are recorded following the last sentence of each paragraph. It is entirely feasible, of course, to provide a separate console that is oriented purely for transcription purposes and incorporating no recording facilities, as such.

The memory organization is such that at any time the first sentence in the preferred sequence of dictation is located in the first position of the memory, the second sentence in the second position and so on. Thus, the memory provides a queuing sequence for playing back the audio information.

The arrangement of the system with its selection capabilities, particularly including the paragraph and sentence buttons, facilitates the rapid review and location of the previously dictated audio segments by the dictator for the purpose of editing or redictating such previously dictated material. The dictator is able to go directly to the beginning of a desired paragraph or sentence without having to scan all the intermediate material in other paragraph or sentence segments.

It is thus seen that the objects set forth at the outset have been accomplished by the present system and that the system provides an unusual degree of flexibility and convenience in the recording and reproducing of audio information together with rearrangement of such information as may be desired.

While the invention has been particularly shown and described with reference to a preferred embodiment, it will be understood by those skilled in the art that various changes in form and detail may be made without departing from the spirit and scope of the invention.

What is claimed is:

1. An audio system for recording signals on a record medium, said record medium having a plurality of independent sentence signal paths thereon arranged in side-by-side relation each of said sentence signal paths being capable of storing an audio sentence segment up to a predetermined size, said system comprising:

a transducer;

means mounting said medium in a signal-transducing relation with respect to said transducer;

means for relatively moving said transducer and said medium to trace any of said independent sentence signal paths on said medium;

selection means for randomly selecting in any order an individual sentence signal path on said medium for recording of signals by said transducer;

means for receiving and converting audio signals representative of sentences and providing them to said transducer for recording in a plurality of selected sentence signal paths on said medium;

segment termination means for indicating termination of an audio sentence segment;

termination signal recording means controlled by said termination means to record in each selected sentence signal path a distinctive signal upon termination of recording of the related audio segment recorded therein and immediately following said related audio sentence segment in said signal path;

a microphone handset;

a control adjunct on said handset;

said control adjunct being depressible in first and second modes;

means responsive to depression of said control adjunct in a first mode to enable recording of signals in a selected sentence signal path; and means responsive to depression of said control adjunct in a second mode to initiate recording of said termination signal.

2. A dictation system for recording signals on a record medium under operator control, comprising:

a transducer;

means mounting said medium in a signal-transducing relation with respect to said transducer;

means for relatively moving said transducer and said medium to trace a plurality of independent sentence signal paths on said medium;

means for randomly selecting in any order individual sentence signal paths on said medium for recording of signals by said transducer;

means for receiving and converting audio signals representative of sentences and providing them to said transducer for recording in a plurality of selected signal paths on said medium;

means for generating coded signal address sets identifying each sentence signal path on said medium;

storage means for initially storing said coded signal address sets in a first preferred sequence indicative of a preferred sequence of playback of the individual sentence signal paths in said medium; and means controlled by the operator of the system for rearranging said coded signal address sets to, at least, a second preferred sequence, the rearrangement being independent of the accessing of signal paths.

3. A dictation system for recording signals on a record medium under operator control comprising:

a transducer;

means mounting said medium in a signal-transducing relation with respect to said transducer;

means for relatively moving said transducer and said medium to trace a plurality of independent sentence signal paths on said medium;

means for randomly selecting in any order individual sentence signal paths on said medium for recording of signals by said transducer;

means for receiving and converting audio signals representative of sentences and providing them to said transducer for recording in a plurality of selected sentence signal paths on said medium;

means for generating coded signal address sets identifying each sentence signal path on said medium;

storage means for initially storing said coded signal address sets in a first preferred sequence indicative of a preferred sequence of playback of the individual sentence signal paths in said medium; and means controlled by said operator to insert a coded signal address set representative of an insert sentence signal path and according to a second preferred sequence within a previously arranged sequence of said coded signal address sets to thereby enable accessing of the inserted sentence signal path in accordance with said second preferred sequence.

4. A dictation system for recording signals on a record medium under operator control comprising:

a transducer;

means mounting said medium in a signal-transducing relation with respect to said transducer;

means for relatively moving said transducer and said medium to trace a plurality of independent sentence signal paths on said medium;

means for randomly selecting in any order individual sentence signal paths on said medium for recording of signals by said transducer, means for receiving and converting audio signals and providing them to said transducer for recording in a plurality of selected sentence signal paths on said medium;

means for generating coded signal address sets identifying each sentence signal path on said medium;

storage means for initially storing said coded signal address sets in a first preferred sequence indicative of a preferred sequence of playback of the individual sentence signal paths in said medium; and means controlled by said operator to delete a coded signal address set representative of a sentence signal path to be deleted from said first preferred sequence of coded signal sets and in accordance with a second preferred sequence to thereby degate accessing of the related deleted sentence signal path.

5. A dictation system for recording signals on a record medium comprising:

a transducer;

means mounting said medium in a signal-transducing relation with respect to said transducer;

means for relatively moving said transducer and said medium to trace a plurality of independent sentence signal paths on said medium;

means for randomly selecting in any order individual sentence signal paths on said medium for recording of signals by said transducer;

means for receiving and converting audio signals representative of sentences and providing them to said transducer for recording in a plurality of selected sentence signal paths on said medium;

means for generating coded signal address sets identifying each signal path on said medium;

storage means for initially storing said coded signal address sets in a first preferred sequence indicative of a preferred sequence of playback of the individual signal paths in said medium; and means to move a previously stored coded signal address set representative of a signal path to be moved to a different location within said first preferred sequence of coded signal address sets to thereby enable accessing of said signal path according to a second preferred sequence.

6. The system of claim 5, further comprising:

means for generating "From" and "To" coded signal control sets representative in that order of coded signal address set locations from which and to which a particular address set is to be moved; and in that order; and means responsive to said "From" generated signal control set and further responsive to said "To" generated signal control set for moving said particular address set indicated from its present location to the location indicated by the second control set generated.

7. A dictation system for recording signals on a record medium, said medium having a plurality of sentence signal paths arranged in side-by-side relation, each signal storage path being capable of storing an audio sentence segment of predetermined size, and said sentence signal paths being grouped in categories according to size such as paragraphs, sections or letters, with each larger catagory comprising at least one signal path of the next smaller category, said system comprising:

a transducer;

means mounting said medium in signal-transducing relation with respect to said transducer;

means for relatively moving said transducer and said medium to trace a plurality of independent signal paths on said medium;

means for randomly selecting in any order individual signal paths on said medium for recording of sentence signals by said transducer;

means for receiving and converting audio signals representative of sentences and providing them to said transducer for recording of a plurality of sentences in a plurality of selected sentence signal paths on said medium;

means for generating coded signal address sets identifying each sentence signal path on said medium, said signal address sets being arranged in categories corresponding to said signal path categories;

storage means for storing said coded signal address sets in a first preferred sequence indicative of a preferred playback of the individual sentence signal paths on said medium, said storage means comprising storage areas arranged according to the categories and of sufficient capacity to store coded signal address sets representative of all sentence signal paths on said medium;

a working memory capable of storing a group of coded signal address sets less than the capacity of said storage means; and means for transferring coded signal address sets between said storage means and said working memory.

8. The system of claim 7, further comprising:

means controlled by said selecting means to operate said transferring means to transfer coded signal address sets to said working memory corresponding to the sentence signal paths selected in said medium.

9. The system of claim 8 wherein said coded signal address sets comprise storage locations set aside to store sentence signal path identity as well as other control information such as marks indicating in-use or non-use of each signal path, and further comprising:

means for altering coded signal address sets in said working memory to reflect current status of the related sentence signal paths.

* * * * *